United States Patent
Post et al.

(10) Patent No.: US 9,686,212 B2
(45) Date of Patent: Jun. 20, 2017

(54) SYSTEMS, METHODS AND INTERFACES FOR USING A MESSAGING PROGRAM ACROSS A MULTIPLE APPLICATIONS AND COMMUNICATIONS ENVIRONMENT

(71) Applicant: Thomson Reuters Global Resources, Baar (CH)

(72) Inventors: Scott Post, Eagan, MN (US); James John Jarvis, Eagan, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 272 days.

(21) Appl. No.: 13/749,004

(22) Filed: Jan. 24, 2013

(65) Prior Publication Data
US 2013/0205229 A1 Aug. 8, 2013

Related U.S. Application Data

(63) Continuation-in-part of application No. 13/368,487, filed on Feb. 8, 2012.

(51) Int. Cl.
*G06F 21/31* (2013.01)
*H04L 12/58* (2006.01)

(52) U.S. Cl.
CPC ............ *H04L 51/04* (2013.01); *H04L 51/046* (2013.01)

(58) Field of Classification Search
CPC ............................ G06Q 10/103; H04L 51/046
See application file for complete search history.

(56) References Cited

U.S. PATENT DOCUMENTS

| | | | |
|---|---|---|---|
| 6,343,313 B1 * | 1/2002 | Salesky et al. | 709/204 |
| 7,685,237 B1 * | 3/2010 | Weaver | G06Q 10/10 709/205 |
| 8,832,210 B2 * | 9/2014 | Muszynski | G06Q 30/01 709/206 |
| 2004/0034860 A1 * | 2/2004 | Fernando et al. | 719/315 |

(Continued)

OTHER PUBLICATIONS

PCT International Search Report and Written Opinion of the International Searching Authority, Jun. 10, 2014.

*Primary Examiner* — Tarek Chbouki

(57) ABSTRACT

A method for using a messaging program across a multiple applications and communications environment includes engaging a multiple applications and communications environment. The multiple applications and communications environment comprises at least one primary application and at least one secondary application. The at least one primary application is associated with a primary work product object and the at least one secondary application is associated with a secondary work product object. The primary work product object and the secondary work product object are associated with a work product matter. The method further includes configuring a messaging program to establish a first chat instance within the primary work product object and a second chat instance within the secondary work product object. The first chat instance and the second chat instance are determined by a set of permissions related to the primary work product object. Another method has the at least one primary application being a web application, a file manager application or an email application and the at least one secondary application being a web application, a file manager application or an email application.

52 Claims, 11 Drawing Sheets

(56) References Cited

U.S. PATENT DOCUMENTS

| | | | | |
|---|---|---|---|---|
| 2004/0095378 | A1* | 5/2004 | Vigue et al. | 345/723 |
| 2004/0153456 | A1* | 8/2004 | Charnock | G06F 17/30713 |
| 2005/0132048 | A1* | 6/2005 | Kogan et al. | 709/225 |
| 2006/0036679 | A1* | 2/2006 | Goodman et al. | 709/203 |
| 2007/0143398 | A1* | 6/2007 | Graham | 709/204 |
| 2008/0094312 | A1* | 4/2008 | Feigenbaum | G06F 3/1454 |
| | | | | 345/2.2 |
| 2009/0094329 | A1* | 4/2009 | Ambati | G06Q 10/10 |
| | | | | 709/204 |
| 2009/0157628 | A1* | 6/2009 | Arthursson et al. | 707/3 |
| 2009/0172101 | A1* | 7/2009 | Arthursson | G06F 3/0486 |
| | | | | 709/205 |
| 2009/0287685 | A1* | 11/2009 | Charnock | G06F 17/30722 |
| 2010/0058202 | A1* | 3/2010 | Rostom | G06F 17/30864 |
| | | | | 715/758 |
| 2010/0070503 | A1* | 3/2010 | Abraham | G06Q 30/00 |
| | | | | 707/737 |
| 2013/0014023 | A1* | 1/2013 | Lee | G06Q 10/103 |
| | | | | 715/751 |
| 2013/0031100 | A1* | 1/2013 | Graham | H04L 51/32 |
| | | | | 707/739 |

\* cited by examiner

SYSTEMS, METHODS AND INTERFACES FOR USING A MESSAGING PROGRAM ACROSS A MULTIPLE APPLICATIONS AND COMMUNICATIONS ENVIRONMENT

RELATED APPLICATIONS

This application is a continuation-in-part of U.S. non-provisional patent application Ser. No. 13/368,487, filed on Feb. 8, 2012, entitled SYSTEM, METHOD, AND INTERFACES FOR WORK PRODUCT MANAGEMENT, the contents of which are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records for non-commercial purposes, but otherwise reserves all copyrights whatsoever. The following notice applies to this document: Copyright© 2013 Thomson Reuters.

TECHNICAL FIELD

Various embodiments of the present invention concern a system, method and interface for using a messaging program across a multiple applications and communications environment.

BACKGROUND

Communication has always been important to society. Throughout the past several decades, various methods of communicating have emerged such as telegraphy, telephony, and, more recently, the internet. In particular, the internet has been a catalyst for online communications such as email, instant textual messaging and instant video/audio conversations. The online communication technologies have also expanded onto smartphones and other mobile devices capable of handling data communication via the internet and/or a telephone service provider. For example, an individual may be using his/her smartphone to send an email, via an email application such as Microsoft Outlook®, to his/her coworker regarding a work topic. In addition, that same smartphone may be used to send a textual message via an instant messaging program like Skype®. If the instant messaging program is also capable of supporting audio and video, the instant messaging system may also be used engage in an audio and/or video conversations.

A known instant messaging program is utilized to facilitate a real-time communication need. For example, when navigating a shoe store website (e.g., web application), there may be functionality that allows a user to engage a shoe store employee via the instant messaging program to discuss information about a given shoe. However, some known web applications have minimal, if any, communication between users. For example, in a known matter management system, a main purpose is to manage a set of legal matter records. Within the known matter management system, a user places a note within the matter record so that other participants within the record can see and/or be notified of the note. However, known matter management systems do not provide messaging programs capable of real-time communications about a matter. Furthermore, there may be more than one application that is related, for example, to the matter. For instance, if a matter record resides within a matter management system, it is likely that there are also emails discussing the matter. Thus, the email application also has a relationship with the matter. However, known approaches do not allow a messaging program to be established within multiple applications.

Accordingly, the present inventors identified a need for using a messaging program associated with a set of permissions across multiple applications.

SUMMARY

The inventors propose systems and methods for the use of a messaging program capable of real-time communications across multiple applications and in some embodiments, across multiple work product participants. Each of the terms mentioned herein are defined and/or described in further detailed within the specification. A method for using a messaging program across a multiple applications and communications environment includes engaging a multiple applications and communications environment. The multiple applications and communications environment comprises at least one primary application and at least one secondary application. The at least one primary application is associated with a primary work product object and the at least one secondary application is associated with a secondary work product object. The primary work product object and the secondary work product object are associated with a work product matter. The method further includes configuring a messaging program to establish a first chat instance within the primary work product object and a second chat instance within the secondary work product object. The first chat instance and the second chat instance being determined by a set of permissions related to the primary work product object. Another method has each of the at least one primary application and the at least one secondary application including at least one of a web application, a file manager application and an email application.

In other words, one advantage of the invention is to establish single chat functionality (e.g., a chat instance and a messaging program) in one or more applications regardless of the source. For example, if a legal matter record (an exemplary primary work product object) is created in a primary application, such as a matter management tool, a legal matter folder (an exemplary secondary work product object) is also created in a secondary, unrelated application, such as an email application (e.g., Microsoft® Outlook). The legal matter record and the legal matter folder are associated with the legal matter ABC. Consequently, when a first chat instance is established for the legal matter record in the matter management tool, a second chat instance is also established for the legal matter folder in the email application. Since the two chat instances are for the same legal matter, the permissions associated with the legal matter record (the primary work product object) are used in both chat instances. These permissions are also associated with work product participants for the given legal matter record. For example, an individual that has access, via a set of permissions, to the given legal matter record is a matter participant. This improvement allows matter participants, who have the proper permissions, to communicate (either written or orally via audio/video) about the legal matter within any application that has an associated work product object and a corresponding chat instance.

Another advantage of the invention is the influence over establishing a chat instance. A legal matter record creator (an exemplary work product object creator) initially controls each chat instance by determining a set of matter participants and the associated permissions. For example, the legal matter record creator may determine that while three matter participants have access to a given legal matter record, only two matter participants should have access to the chat instance. This type of control allows the legal matter record creator to construct individually tailored permission decisions based on each legal matter record.

Additional advantages and/or features of the present invention will be set forth in part in the description. It is to be understood that both the foregoing general description and the following detailed description of the present invention are exemplary and explanatory and are intended to provide further explanation of the present invention as claimed.

BRIEF DESCRIPTION OF THE DRAWINGS

FIG. 4 illustrates an exemplary interface 400 which corresponds to one or more embodiments of the invention.

FIG. 5 illustrates an exemplary work product object 410, shown at a first instance of time, including an exemplary chat instance 515 and an exemplary set of work product participants 520 which corresponds to one or more embodiments of the invention.

DETAILED DESCRIPTION OF THE EXEMPLARY EMBODIMENT(S)

Figure 1:
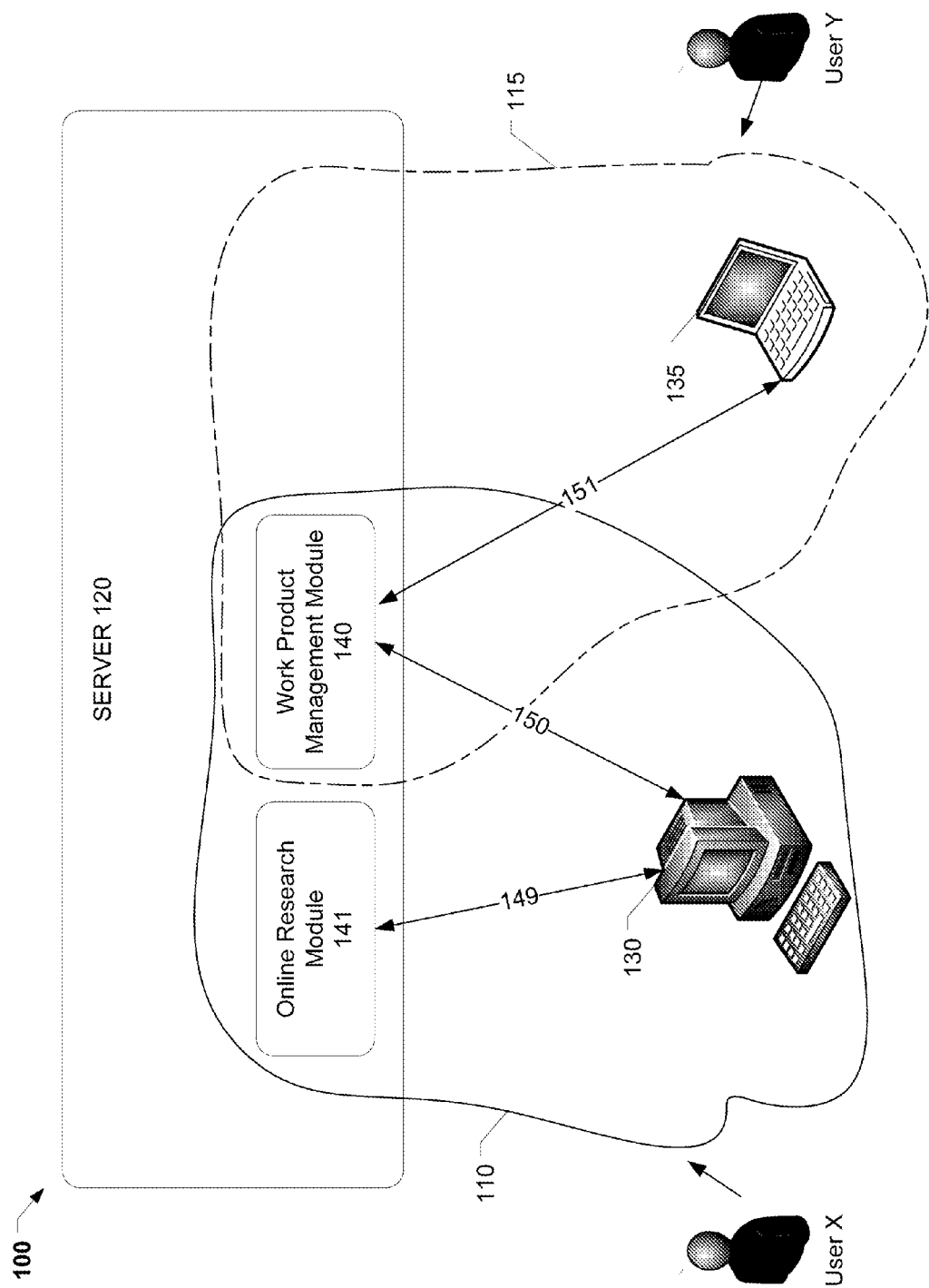
FIG. 1 illustrates an exemplary system 100 which corresponds to one or more embodiments of the invention.

The description includes many terms with meanings derived from their usage in the art or from their use within the context of the description. However, as a further aid, the following examples are presented. Multiple applications and communication environment is an atmosphere for a given user which includes at least one primary application and at least one secondary application. See FIGS. 1 and 1A for illustrations of exemplary multiple applications and communication environments. An application, whether primary or secondary, is a program and/or a group of programs designed for a user on an access device, such as a laptop. Exemplary applications may include but are not limited to a web application, a file manager application, an email application, systems software, applications software and the like. In addition, exemplary applications may be included in one or more categories mentioned. For example, an email application may be a specific type of application software. Some applications are installed on a user's access device such as an email application. Other applications use the access device to access the application via the internet such as a web application. A primary application is a principal application associated with a work product object and determines the permissions applied to a given chat instance. A secondary application receives the permissions information and the work product object from another source (e.g., the primary application). A work product object is a representation of a work product matter. A work product matter characterizes a particular event/topic. An exemplary work product matter may be legal matter XYZ relating specifically to a litigation event involving case number XYZ. Legal matters characterize legal events/topics regarding litigations, transactions and the like. Work product matters may also relate to tax, accounting, financial, healthcare, and scientific events/topics. Referring back to a work product object, a work product object includes any materials that have been created, drafted, manipulated, edited, organized and/or uploaded by a user. Work product objects may be produced by tax, accounting, financial, healthcare, scientific, and legal professionals. Exemplary work product objects include briefs and memoranda associated with litigation matters, contracts and drafts associated with transactional matters, records, emails, documents, folders, SEC filings, stock price listings, scientific white papers and the like. For example, the work product object could be a record of legal matter details. In another example, the work product object could be a folder that contains additional work product objects such as documents, emails, electronic correspondence and/or research, about the given legal matter. A messaging program provides the chat functionality for a given work product object. A chat instance provides an interface between a messaging program and a work product object. An exemplary chat instance 515 is illustrated as a button in FIGS. 5 and 6. The chat instance 515 indicates that the chat functionality may be utilized for the given work product object. A chat session is a dialogue (either written or oral) between a set of work product participants communicating via the messaging program. A chat session is initiated by the user and is associated with a set of work product participants. A work product participant is an entity that has access to a given work product object based on a set of permissions. For example, one work product participant may be the creator of the work product object. Another example may be an individual who was given access to the work product object. The detailed description herein provides more detail regarding the configuration and/or function of the terms defined above.

Exemplary Systems

FIG. 1 shows an exemplary system 100 which may be adapted to incorporate the capabilities, functions, methods, and interfaces of the present invention. System 100 includes a server 120, multiple applications and communication environment 110 for user X and multiple applications and communication environment 115 for user Y.

Server 120 is generally representative of one or more servers for serving data in the form of a webpage or other markup language with associated applets, ActiveX controls, and/or other related software and data structures. For simplification purposes, in FIG. 1, server 120 only includes software modules 140 and 141. Further component details regarding server 120 are discussed in FIG. 1A. As shown in FIG. 1, in one embodiment, the software modules include a work product management module 140 and an online research module 141. These software modules are also known throughout the detailed description as primary and/or secondary applications. For example, the work product management module 140 may be considered the primary application while the online research module 141 may be considered the secondary application. Details of the software modules 140 and 141 configured in memory 122 (shown in FIG. 1A) are discussed in further detail below. In addition, server 120 transmits a signal via one or more wireless or wireline transmission channels 149, 150, and 151 to at least one access device. For example, a wireless or wireline transmission channel 150 may be associated with a request to send work product object information to access device 130. While wireless or wireline transmission channels 149, 150, and 151 may be illustrated in FIG. 1 as multiple, separate transmission channels, one skilled in the art would appreciate that another embodiment may include a single wireless or wireline transmission channel.

Multiple applications and communications environments 110 and 115 are exemplary environments for users X and Y, respectively. User X's multiple applications and communications environment 110 consists of at least one access device 130, online research module 141 and work product management module 140. The access device 130 is configured to transmit/receive signals to online research module 141 via wireless or wireline transmission channel 149. The access device 130 is configured to transmit/receive signals to work product management module 140 via wireless or wireline transmission channel 150. User Y's multiple applications and communications environment 115 consists of at least one access device 135 and work product management module 140. The access device 130 is configured to transmit/receive signals to work product management module 140 via wireless or wireline transmission channel 151. While the current examples include user X having one access device and two software modules and user Y having one access device and one software module, a multiple applications and communications environment may be any combination that supports the systems, methods and interfaces of the present invention.

Access devices 130 and 135 are generally representative of one or more access devices for users X and Y, respectively. In addition, access devices 130 and 135 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. In FIG. 1, user X's access device 130 is a personal computer and user Y's access device 135 is a laptop.

Figure 1A:
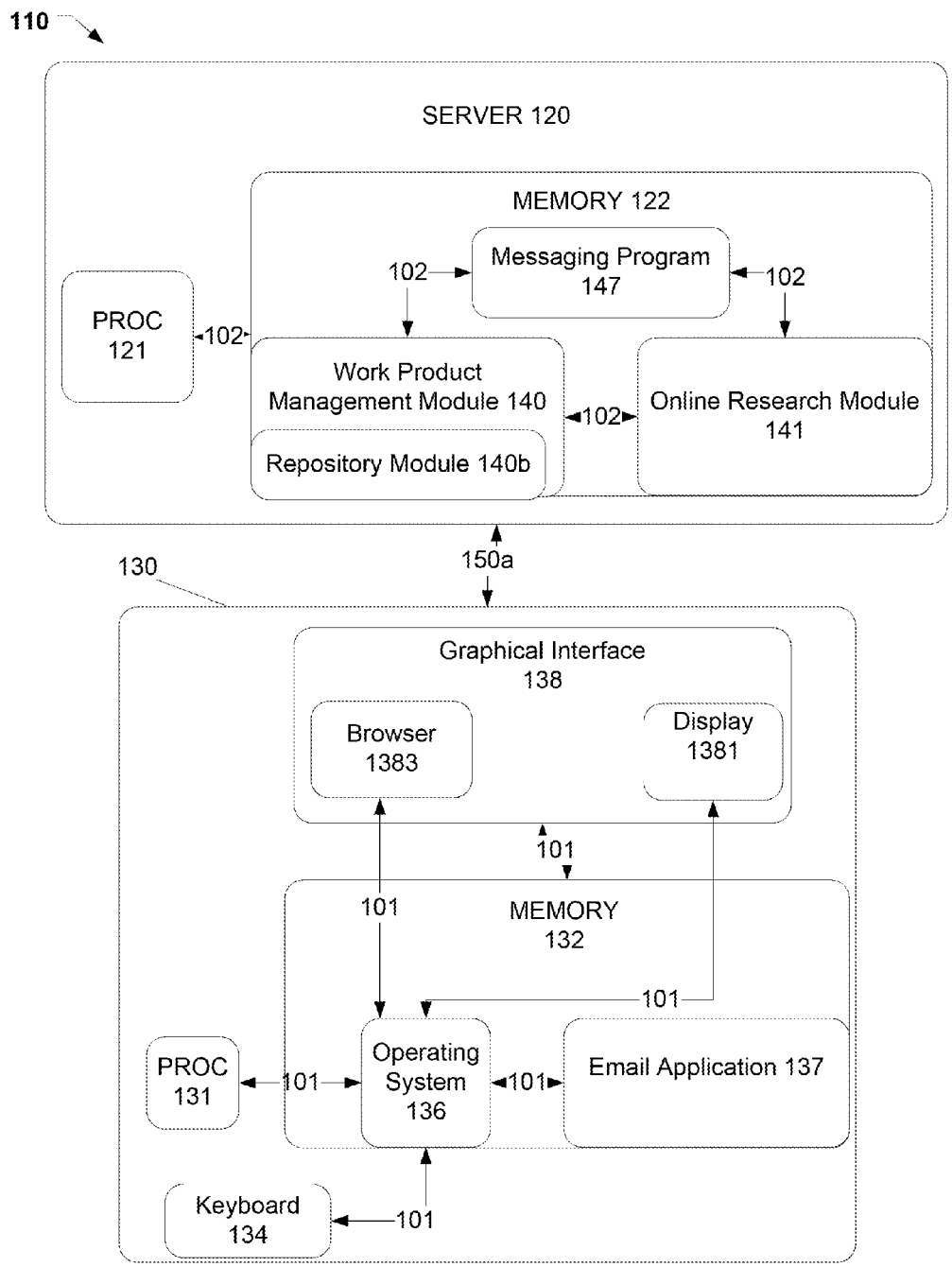
FIG. 1A illustrates an exemplary multiple applications and communications environment 110 which corresponds to one or more embodiments of the invention.

FIG. 1A shows exemplary multiple applications and communications environment 110 for user X which may be adapted to incorporate the capabilities, functions, methods, and interfaces of the present invention. Multiple applications and communications environment 110 includes access device 130 and at least a portion of server 120. While FIG. 1A only illustrates multiple applications and communications environment 110, in particular, the relationship between access device 130 and server 120, the description provided below may be applied, in principle, to multiple applications and communications environment 115. In this exemplary embodiment, the wireless or wireline transmission channels 149 and 150 referenced in FIG. 1 are now being shown as a single wireless or wireline transmission channel 150*a*.

Server 120 includes a processor module 121 and a memory 122, wherein the memory 122 further includes software modules 140, 141, and 147. As shown in FIG. 1A, in one embodiment, the software modules include a work product management module 140, an online research module 141, and a messaging program 147. Details of the software modules 140, 141 and 147 configured in memory 122 are discussed in further detail below. Processor module 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) within access device 130 and server 120, respectively. Processor module 121 may use computer bus 102 to queue a request that is to be transmitted through a signal, from server 120, via a wireless or wireline transmission channel 150*a* and is then ultimately received by the processor module 131 through the utilization of computer bus 101. Generally, server 120 transmits the signal via a wireless or wireline transmission channel 150*a* to at least one access device, such as access device 130.

Processor module 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores software modules 140, 141 and 147.

Work product management module 140 is configured to execute from memory 122. The work product management module 140 includes at least a repository module 140*b*. An exemplary work product management module 140, including repository module 140*b*, is described in U.S. patent application Ser. No. 13/368,487 entitled "System, Method, And Interfaces For Work Product Management." This application is herein incorporated by reference. Repository module 140*b* takes the exemplary form of one or more electronic, magnetic, and/or optical data-storage devices. The data stored in the repository module 140*b* may be related to legal, financial, scientific, tax and/or accounting information. Furthermore, the content and/or a subset of the content within the repository module 140*b* may be subscriber content. Subscriber content includes content and related data for controlling, administering, and managing pay-as-you-go and/or subscription based access. For instance, a user may have to subscribe to a legal research information retrieval service (e.g., WestlawNext™). The content is stored in the repository module 140*b* and cannot be accessed until a set of user credentials are authenticated. For instance, user credentials may be a user name and associated password. Once the credentials are successfully authenticated on server 120, a delivery signal is transmitted via the wireless or wireline transmission channel 150*a* to access device 130. For purposes described herein, successfully authenticating a set of user credentials means the user credentials were accepted by an authentication system (not shown but well known to those skilled in the art).

Online search module 141 includes one or more search engines and related user-interface components (not shown), for receiving and processing user queries. An exemplary online search module 141 is described in U.S. patent application Ser. No. 11/538,749 entitled "Systems, Methods, And Software For Identifying Relevant Legal documents." This application is herein incorporated by reference.

Figure 1B:
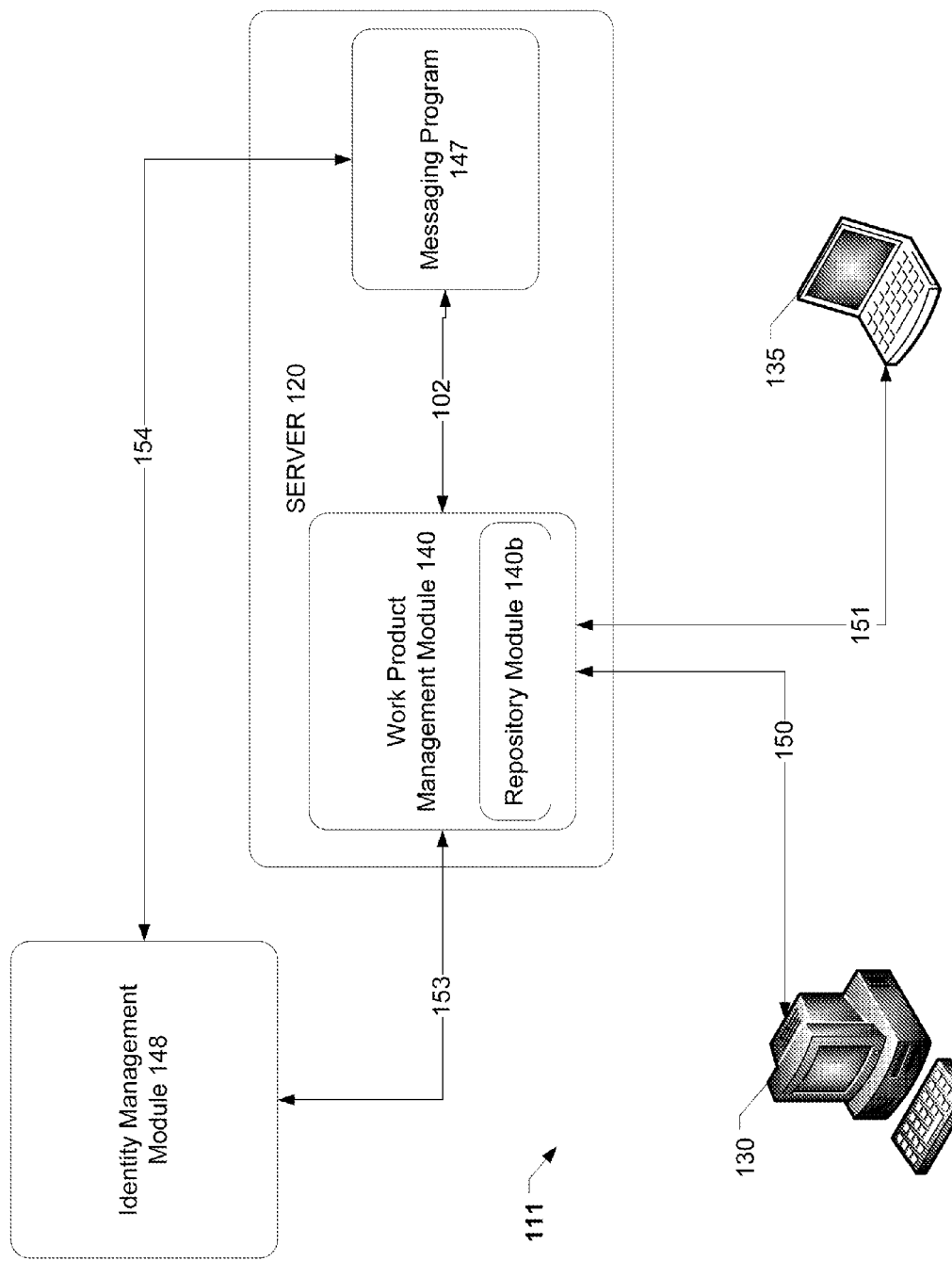
FIG. 1B illustrates an exemplary sub-system 111 which corresponds to one or more embodiments of the invention.

Messaging program 147 is configured to create chat instances and/or chat sessions related to a work product object. Consequently, the messaging program 147 is also configured to interact with one or more applications, either primary and/or secondary. In some embodiments, the messaging program 147 is configured to send/receive instructions regarding identity management. For example, in FIG. 1B, sub-system 111 illustrates access devices 130 and 135 communicating with work product management module 140 via wireless and wireline transmission channels 150 and 151, respectively. The work product management module 140 is configured to communicate with the messaging program 147 via computer bus 102 in server 120. The work product management module 140 and messaging program 147 are configured to communicate with an identity management module 148 via wireless and wireline transmission channels 153 and 154, respectively. The identity management module 148 is configured to store information for authentication purposes. Even though authentication functionality exists within the work product management module 140, having a sub-set of information regarding a user's identity stored and accessed away from the primary application assists in preventing user information from being hacked. In order for the identity management module 148 to release the user information, the identity management module 148 should be configured to receive a valid security token. Security tokens are used in addition to or in place of a password to prove that a user's identity electronically. The token acts like an electronic key. The security token is used to electronically unlock a storage component (not shown) within the identity management module 148 regarding a given user. The user's information is then encrypted and sent to the messaging program 147. This user information is displayed during a chat session. See FIG. 3A and corresponding description for further detail. Referring back to FIG. 1A, in this exemplary embodiment, the messaging program 147 is associated with but is not embedded/coupled to the work product management module 140, the online search module 141 and/or the email application 137. However, in other embodiments, it may prove beneficial to embed an instance of the messaging program 147 within each application including primary and secondary applications. For example, an embedded instance may provide quicker and more efficient rendering of chat session displays.

Access device 130 is generally representative of one or more access devices for user X. Specifically, in this exemplary embodiment, access device 130 is a personal computer which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136 and an email application 137. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines which one or more of the software modules 140, 141 and/or 147 needs to be utilized, engages the given software module through the signal via a wireless or wireline transmission channel 150, accepts the software module output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When one or more of the software modules 140, 141 and 147 are initiated, a display 1381 is defined in memory 132 and rendered on graphical interface 138 via the browser 1383.

An email application 137 is a type of application software that allows for the creation, management and storage of emails, calendar events and tasks. The email application 137 is configured to be installed and stored within memory 132. As described previously, applications may be considered a primary and/or a secondary application. For example, the work product management module 140 may be considered a primary application while the email application 137 is considered the secondary application. While not illustrated in FIG. 1A for simplification purposes, the email application 137 is also configured to interact, via computer bus 101, with the processor 131, keyboard 134, browser 1383 and display 1381 as described previously with the operating system 136. For example, the email application 137 may be configured to use display 1381 and browser 1383 to render and ultimately display an email correspondence to a user. In another example, the keyboard 134 may be used to create an input (i.e., an email) for the email application 137. The processor 131 and operating system 136 are each configured to process and implement any instructions/tasks needed by the email application 137.

Exemplary Methods

Figure 2:
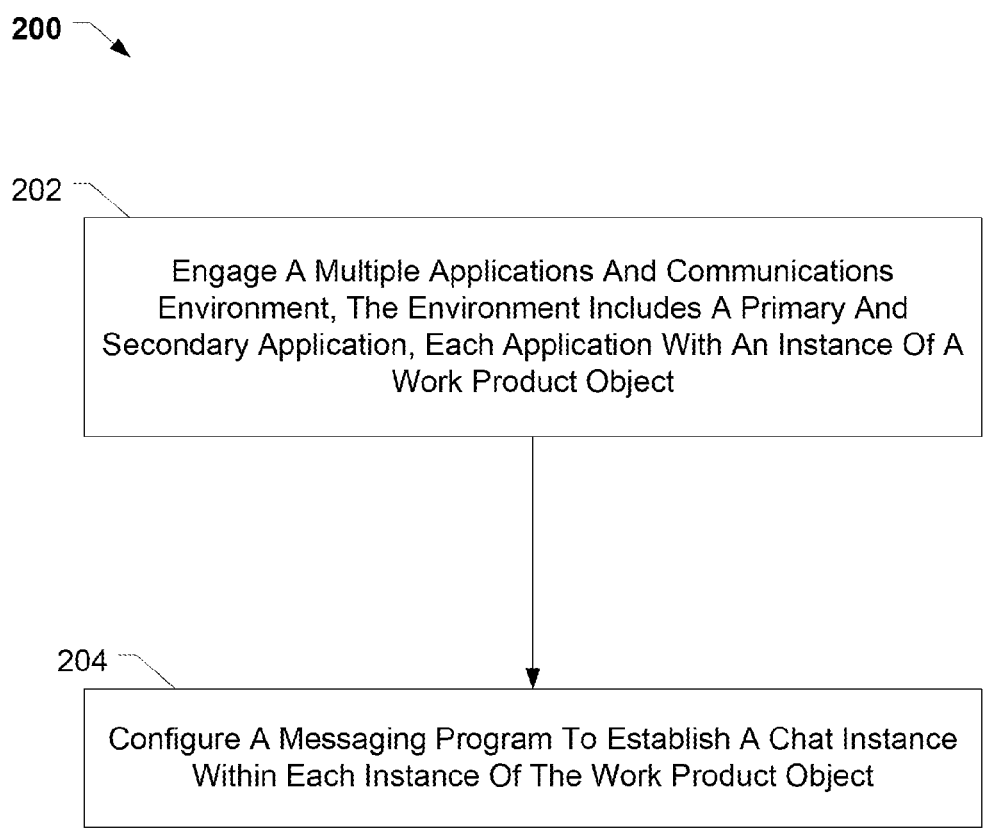
FIG. 2 outlines an exemplary method 200 which corresponds to one or more embodiments of the invention.

FIG. 2 outlines an exemplary method 200. Method 200 includes functional blocks 202-204. These functional blocks are steps that perform actions including assignments, decisions, assessments and other like functions. In the following exemplary embodiments for method 300, elements of FIGS. 1 and 1A are referenced.

In step 202, a multiple applications and communications environment 110 is engaged. Using FIG. 1A as an exemplary embodiment, user X's multiple applications and communications environment 110 includes a primary application, the work product management module 140, and a secondary application, the email application 137. Access device 130 contains, in part, an email application 137 and may access work product management module 140 via the wireless or wireline transmission channel 150. In this example, since user X creates a work product object with associated permissions within work product management module 140, the work product management module 140 is considered the primary application and the secondary application is the email application 137. This creation of the work product object within the work product management module 140 is the primary work product object.

For instance, the work product management module 140 may be a legal matter management tool that helps create and manage legal matter records for attorneys and other personnel. When an individual creates a legal matter record within the legal matter management tool, that legal matter record is considered a primary work product object. See FIG. 4 for an illustration of exemplary work product objects. Also within user X's multiple applications and communications environment is the secondary application, email application 137. The email application 137 is a component of access device 130 and does not initially communicate with the work product management module 140. To allow communication, a monitoring component is installed within the email application 137 to send/receive requests from the primary application, in this example, the work product management module 140. In some embodiments, the email application 137 does not have to know which application is primary. Instead, the email application 137 may consider every application it sends a request to as a primary application. Thus, there may be more than one primary application within a multiple applications and communications environment. An exemplary monitoring component may be polling software that allows the email application 137 to send a request to the work product management module 140 asking if there are any updates (e.g., newly added work product objects). If there are no updates, then the email application 137, via the polling software, receives a notification that there are no updates. If there are newly added work product objects, the email application 137, via the polling software, receives instructions to create a secondary work product object for each of the newly added work product objects. The secondary work product object and the primary work product object are associated with a given work product matter. For example, if user X creates a primary legal matter record 1001-1234 (a primary work product object) within the work product management module 140, the installed polling software within the email application 137 sends a request to the legal matter management tool (an exemplary work product management module 140) asking if there are any newly added legal matter records (exemplary work product objects). The email application 137, via the polling software, receives information regarding the newly added legal matter record 1001-1234 in order to create a secondary legal matter record 1001-1234 (a secondary work product object) within the email application 137. The primary and secondary legal matter records 1001-1234 are associated with legal matter 1001-1234 (an exemplary work product matter).

In some embodiments, the primary work product object may be represented as a record and the secondary work product object may be represented as a folder. For example, legal matter 1001-1234 is represented as a primary record in the work product management module 140. All documents related to the legal matter 1001-1234, and thus the legal matter record, are stored in repository module 140b as a matter root folder entitled "Matter 1001-1234." When the polling software from the email application 137 determines that a newly added legal matter record has been created in the work product management module 140, the email application 137, via the polling software, receives instructions and information to create a secondary work product object. Exemplary information that may be sent is the matter root folder name and the documents corresponding to legal matter record 1001-1234. Therefore, if legal matter record 1001-1234 has two sub-folders entitled "Contract ABC" and "Clause XYZ," the secondary work product object would have the main folder entitled "Matter 1001-1234" with two sub-folders entitled "Contract ABC" and "Clause XYZ" to mimic the foldering structure of repository module 140b. Since the email application 137 understands information regarding creating of folders and storage of documents within the folders, the email application 137 creates the folder according to the instructions and information. As the multiple applications and communications environment is engaged along with the primary work product object being created, the process continues to step 204.

Figure 2A:
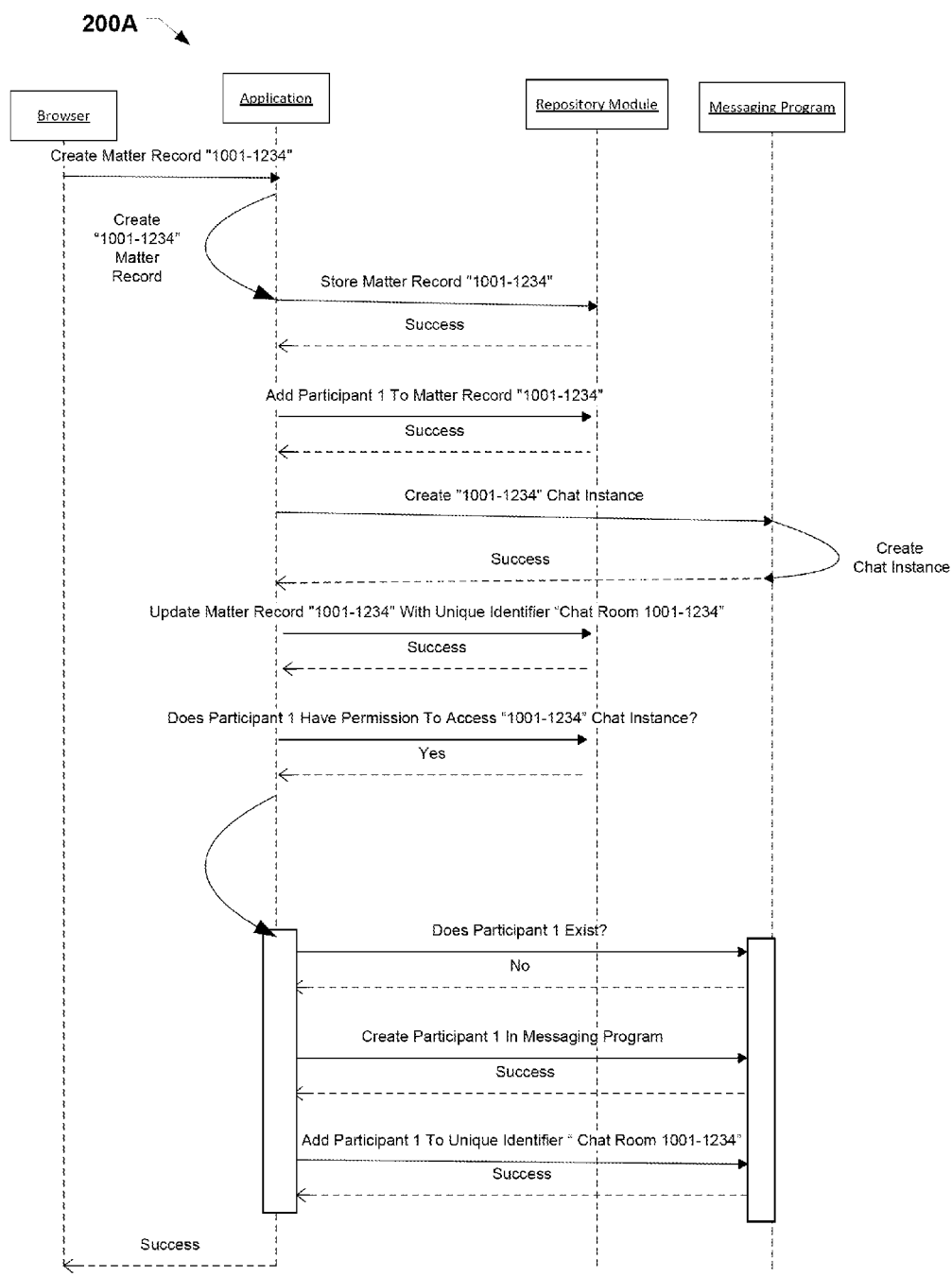
FIG. 2A illustrates an exemplary diagram 200A which correspond to one or more embodiments of the invention.

In step 204, a messaging program 147 is configured to establish a first chat instance within the primary work product object and a second chat instance within the secondary work product object. The first chat instance and the second chat instance are determined by a set of permissions related to the primary work product object. In other words, when user X creates primary legal matter record 1001-1234, not only is the primary legal matter record created but a first chat instance is also created. In FIG. 2A, exemplary architecture 200A illustrates the creation of an exemplary chat instance 515 (see FIG. 5). For purposes of this example, elements of FIG. 1A are referenced. In addition, the application box shown in FIG. 2A is the primary application, in particular, work product management module 140. The browser box shown is the browser 1383 from the access device 130. From browser 1383, a user wants to create primary legal matter record 1001-1234 in the work product management module 140. The application receives the instruction to create the 1001-1234 matter record and the record is stored in the repository module 140b. Next, the user selects a set of work product participants that should be associated with the 1001-1234 matter record. Refer to previously mentioned U.S. patent application Ser. No. 13/368,487 entitled "System, Method, And Interfaces For Work Product Management" for examples on how to add a set of work product participants to a work product management module 140. Each selected work product participant is added and associated with the primary matter record 1001-1234. The relationship between the work product participant and the related matter record 1001-1234 is stored in the repository module 140b. Once a matter and associated work product participants are created, the application sends an instruction to the messaging program 147 to create a first chat instance for the primary matter record in the primary application. After creating the first chat instance, the messaging program 147 creates a unique identifier for primary work product object. An exemplary unique identifier may be a string of characters associated with a given work product object. For example, if matter record 1001-1234 is a unique matter name, then an exemplary unique identifier for the primary matter record may be "Chat Room 1001-1234." After the unique identifier has been determined, the messaging program 147 then notifies the application that the first chat instance has been successfully created along with sending the unique identifier for the given work product object. Next, the application receives and updates the repository module 140b with the association between the matter record 1001-1234 and the unique identifier "Chat Room 1001-1234." Next, to add a work product participant to the first chat instance, the application checks with the repository module 140b to see if the work product participant's permissions allow the given participant access to the first chat instance for the given matter record. If the work product participant is not allowed access to the first chat instance (not shown), the work product participant does not get added to the display of the set of work product participants for the given chat instance. If the work product participant is allowed access, the repository module 140b notifies the application of a successful allowance. Next, the application asks the messaging program 147 if a selected work product participant exists within the messaging program 147. If the work product participant does not exist, the application further instructs the messaging program 147 to create the work product participant within its program. Once successful, the messaging program 147 creates and stores an association between the recently established work product participant and the given unique identifier. After the work product participant is created and successfully associated with the given unique identifier, an exemplary chat instance 515 along with the set of work product participants 520 (see FIG. 5) is rendered and ultimately displayed to the user via browser 1383.

Referring back to FIG. 2, as the secondary application determines that a secondary work product object needs to be created, a second chat instance is also created, via the exemplary architecture in FIG. 2A, in the secondary work product object. In fact, the second chat instance in the secondary work product object is the same as the first chat instance based on the set of permissions associated with the primary work product object. In some embodiments, there are no work product participants (other than the work product object creator) for a primary work product object. Therefore, a chat instance may be created with no eligible work product participants with which to converse. Other embodiments may wait until a work product participant is added to the work product object before establishing a chat instance within the primary work product object and consequently the secondary work product object. Referring back, the secondary work product object inherits the permissions from the primary work product object. Therefore, any chat instance ultimately inherits the permissions of the primary work product object. In some embodiments, certain permissions that are given for a primary work product object are not acceptable for chat instance purposes. For example, user X may add a work product participant to a primary work product object as a proxy designation. This designation is helpful in the day to day functions of a work product management module 140. However, user X may not want the proxy to have access to chats regarding the substance of the primary work product object. In this scenario, the repository module 140b stores each permission designation along with an instruction as to whether the given individual should be displayed in the chat instance.

Figure 3:
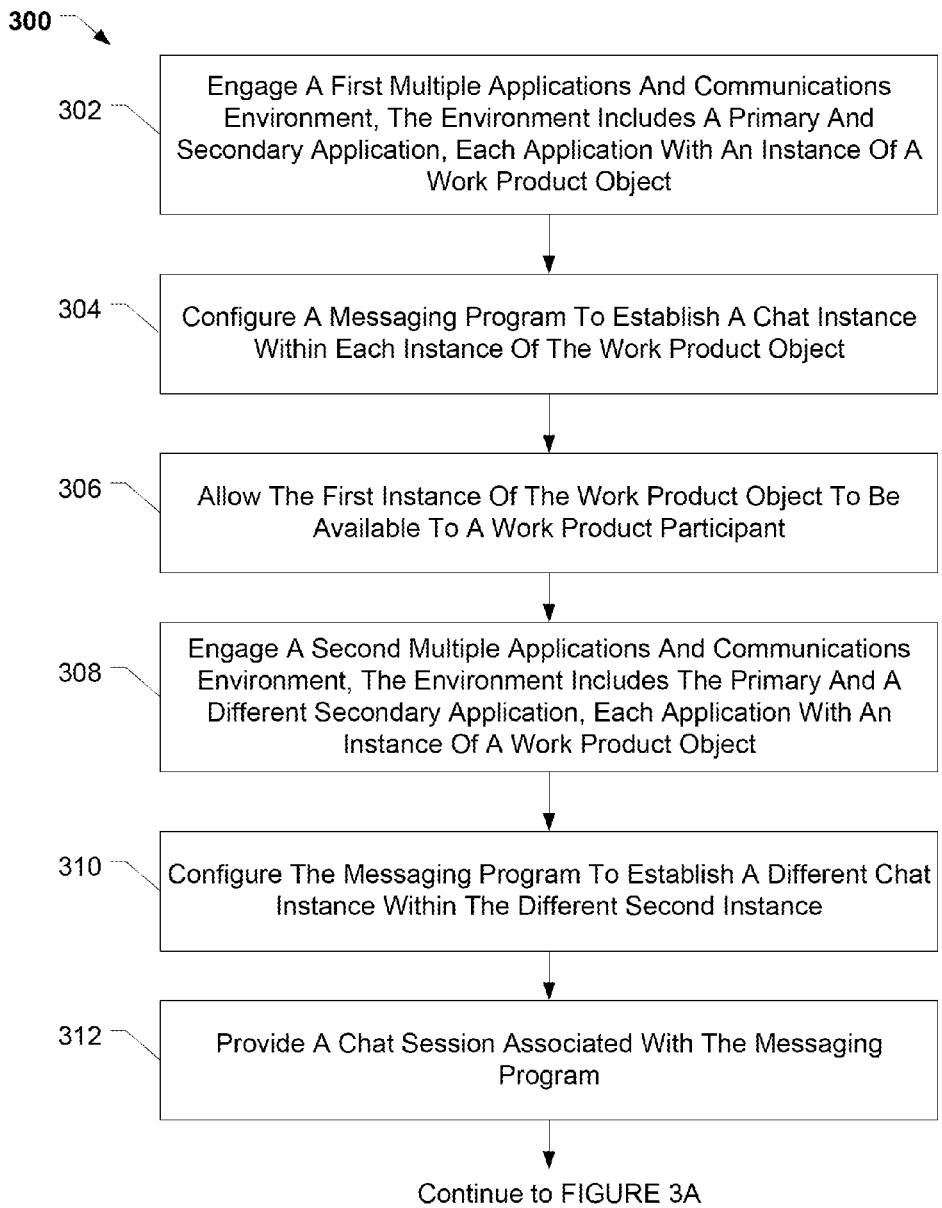
FIG. 3 outlines an exemplary method 300 which corresponds to one or more embodiments of the invention.
Figure 3A:
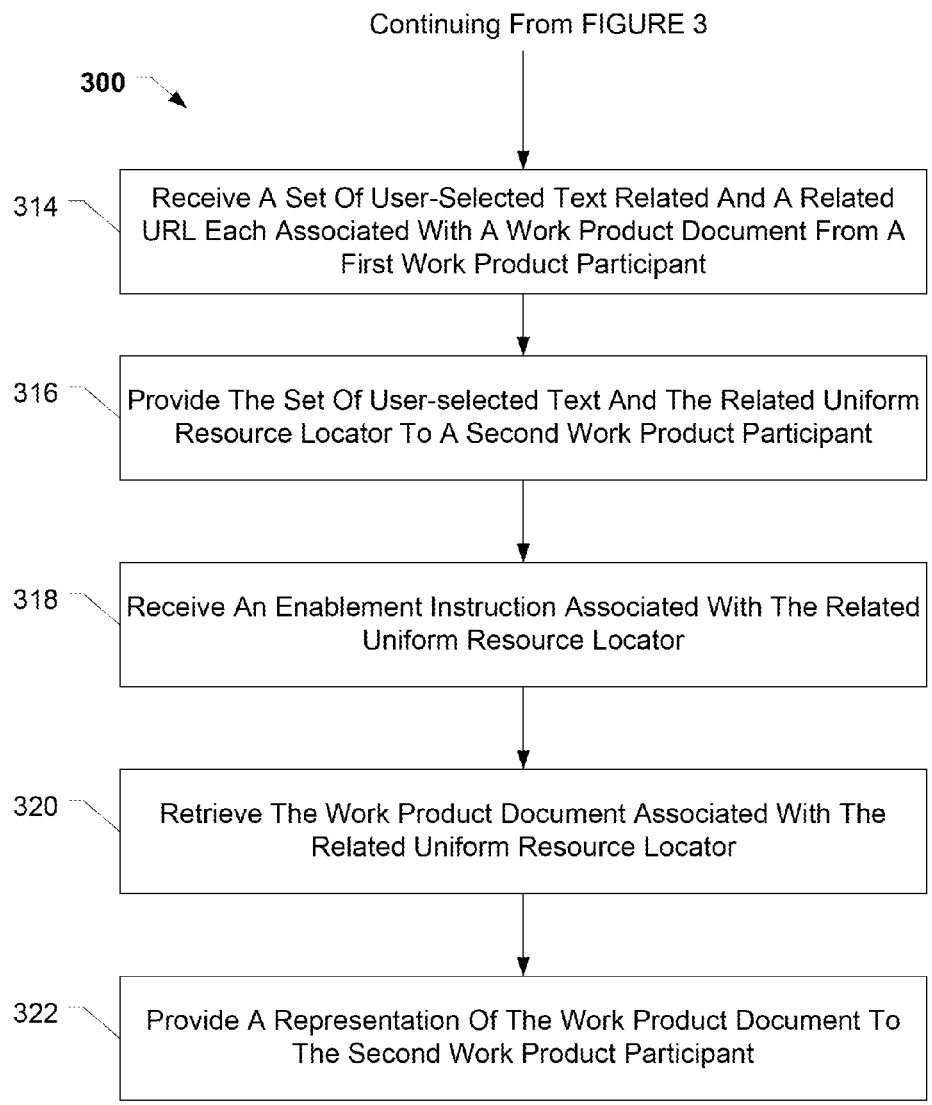
FIG. 3A outlines a continuation of exemplary method 300 which corresponds to one or more embodiments of the invention.

FIG. 3 outlines an exemplary method 300 wherein two multiple applications and communications environments are engaged. Method 300 includes functional blocks 302-322. These functional blocks are steps that perform actions including assignments, decisions, assessments and other like functions. In the following exemplary embodiments for method 300, elements of FIGS. 1 and 1A are referenced.

Steps 302 and 304 are functionally equivalent to steps 202 and 204 previously described. In step 306, the primary work product object is available to at least one work product participant. When user X chooses a work product participant for the primary work product object in the primary application, the primary work product object is now available to the given work product participant. For example, user X creates a legal matter record 1001-1234 (an exemplary primary work product object) in the work product management module 140 which, in this example, is the primary application. Up until user X selects one or more work product participants, user X is the only individual that has access to that legal matter record. Consequently as explained above, the primary legal matter record that was created in the work product management module 140 is then created as a folder entitled "Matter 1001-1234" (an exemplary secondary work product object) in the email application 137. The legal matter record and the folder are each associated with the legal matter 1001-1234. Now user X decides to add work product participant Y (also known as user Y in FIG. 1) as a matter participant in work product management module 140. Once the permissions are selected, saved and ultimately stored in repository module 140b, the work product management module 140 is configured to make the primary work product object visible to work product participant Y due to the given permissions from user X. After the primary work product object now being available to work product participant Y, the process advances to step 308.

In step 308, a second multiple applications and communications environment is engaged such as, from the previous example, user Y's multiple applications and communications environment 115 in FIG. 1. Continuing with this example, user Y's multiple applications and communications environment 115 is engaged as soon as the primary work product object is made available to user Y. Therefore, when the primary work product object was made available to work product participant Y from the work product management module 140, user Y's multiple applications and communications environment 115 became engaged. Consequently, the primary application is the work product management module 140 because the creation of the primary work product object is from the work product management module 140. In addition, the first chat instance associated with the primary work product object is also available to user Y. For example, when the primary work product object is made visible to user Y, the associated first chat instance is also made visible to user Y if permissions allow (refer back to step 204 for a discussion on permissions). Assuming work product participant Y's access device 135 has a different email application (e.g. another secondary application) (not shown) with polling software, a tertiary work product object is created using functionality similar and/or equivalent to steps 202 and 302. The tertiary work product object, similar to the secondary work product object, is associated with the given work product matter. As a second multiple applications and communications environment 115 is engaged along with the creation of a tertiary work product object, the process continues to step 310.

In step 310, the messaging program 147 is configured to establish a third chat instance within the tertiary work product object using functionality similar and/or equivalent to steps 204 and 304. As stated previously, chat instances, including the third chat instance, are determined by the permissions related to the primary work product object. Refer back to FIG. 2A for a description on chat instance creation. After the creation of a third chat instance occurs, the exemplary chat instance 515 along with the set of work product participants 520 (see FIG. 5) is rendered and ultimately displayed to the user via browser 1383.

Figure 5:
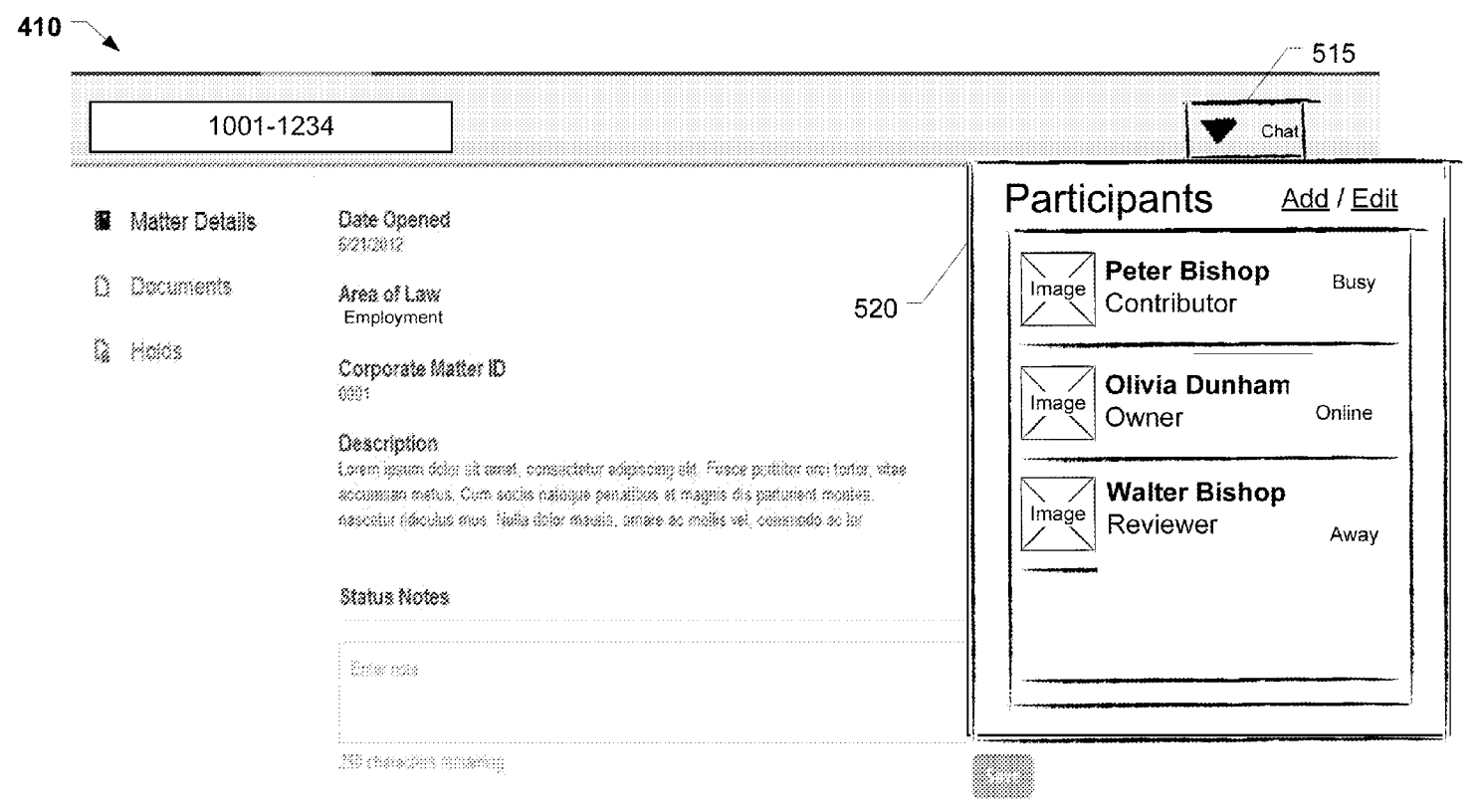
Figure 6:
FIG. 6 illustrates an exemplary work product object 410, shown at a second instance of time, including an exemplary chat instance 515 and an exemplary chat session 620 which corresponds to one or more embodiments of the invention.

In some embodiments, a work product participant wants to utilize the chat functionality that is now established within at least two chat instances. Therefore, method 300 further includes, in step 312, providing a chat session. The chat session is associated with the messaging program 147. Now that one or more chat instances are established, either in the primary, secondary and/or tertiary work product object, a work product participant may initiate a chat session. The chat session is associated with a subset of the work product participants. For example, if the set of work product participants included three work product participants that had the associated permissions to use the chat functionality, user X, user Y and user Z, any of the three work product participants may initiate a chat session and select a subset of work product participants. In some embodiments, the subset of work product participants includes all the work product participants. In other embodiments, the subset of work product participants includes less than all the work product participants. An exemplary set of work product participants 520 and an exemplary chat session 620 are illustrated in FIGS. 5-6 and described in the exemplary interfaces section.

Figure 3B:
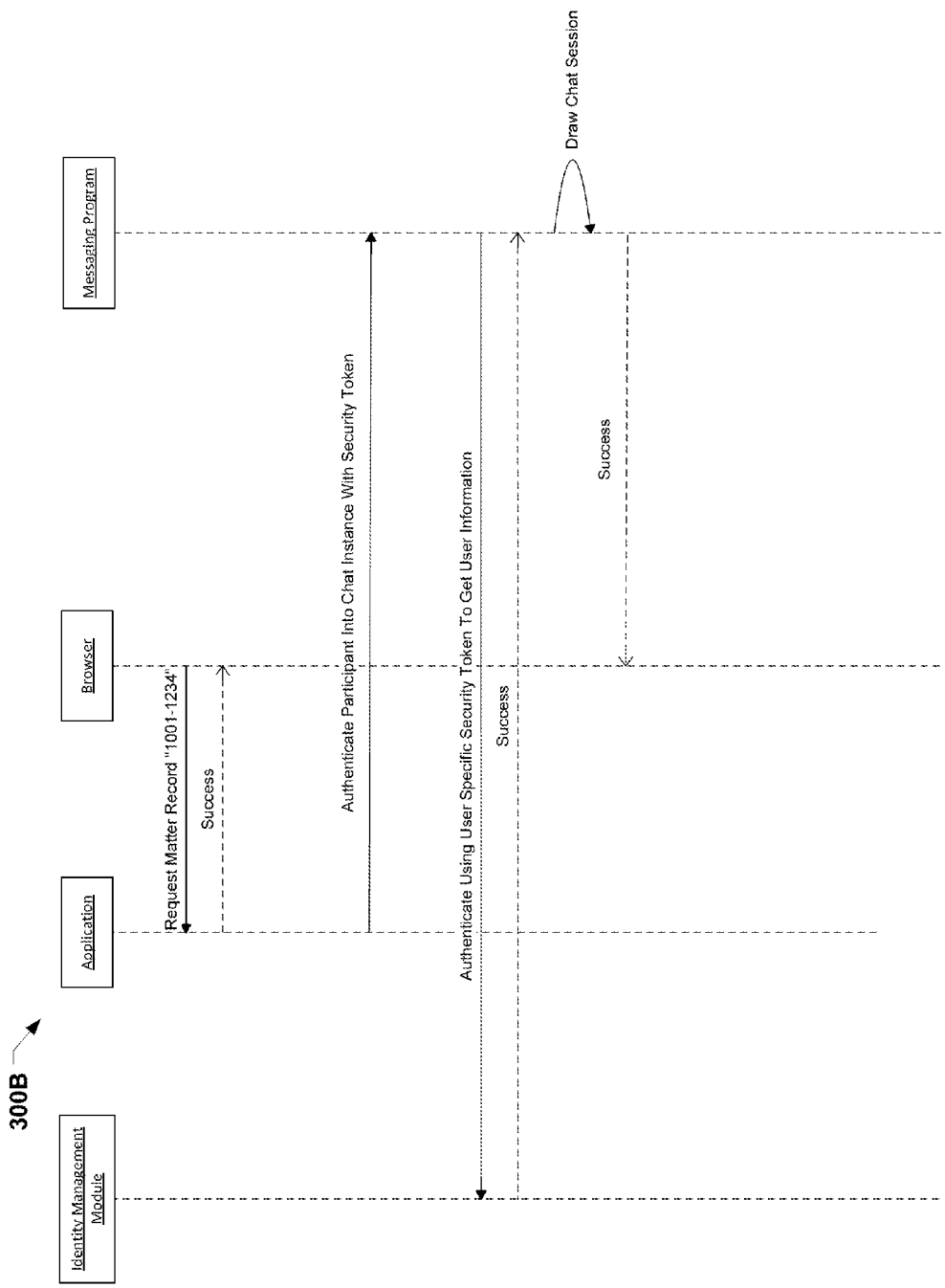
FIG. 3B illustrates an exemplary diagram 300B which corresponds to one or more embodiments of the invention.

In FIG. 3B, exemplary architecture 300B illustrates the creation of an exemplary chat session. For purposes of this example, elements of FIG. 1A are referenced. In addition, the application box shown in FIG. 3B is the primary application, in particular, work product management module 140. The browser box shown is the browser 1383 from the access device 130. From browser 1383, a work product participant requests access to matter record 1001-1234 from a work product management module 140. The 1001-1234 matter record is retrieved from the work product management module 140, in particular the repository module 140*b*, and ultimately displayed to the browser 1383 via wireless or wireline transmission channel 150. Next, the application needs to authenticate that each work product participant within the subset is allowed into the chat instance for the matter record 1001-1234 within the work product management module 140. The authentication process includes the application sending a security token, which is specific only to the given work product participant, to the messaging program 147. In order for the messaging program 147 to officially authenticate a given work product participant, the messaging program 147 sends the security token to the identity management module 148. The identity management module 148 receives the security token and verifies that it is valid for the given work product participant. If the security token is not valid for the given work product participant (not shown), a do-not-display instruction is sent to the messaging program 147 to refrain from displaying a chat session. For instance, an invalid security token occurs when an individual attempts to impersonate a work product participant on the work product management module 140 by sending a fake security token hoping it authenticates the impersonating work product participant. If the security token is valid for the given work product participant, the security token is used to electronically unlock a storage component (not shown) within the identity management module 148 regarding a given user. The user's information is then encrypted and sent to the messaging program 147 along with a display instruction. Once the messaging program 147 receives the given user information and display instructions for each valid work product participant, the exemplary chat session is rendered and displayed for all validated work product participants. After the chat session is initiated, in some embodiments, the method 300 may continue to step 314 in FIG. 3A.

During an initiated chat session, a work product participant utilizing the chat session may wish to send, via the chat session and corresponding chat functionality, a snippet of text from a document that he/she is referencing. For example, a first work product participant may engage the work product management module 140, in particular the repository module 140*b*, and select the indemnity clause text (exemplary user-selected text) from contract ABC. The first work product participant then copies that user-selected text and pastes it into the current chat session. The first work product participant then sends that user-selected text through the current chat session associated with the messaging program 147, via wireline or wireless transmission channel 150.

However, in a preferred embodiment, as the first work product participant elects to copy this user-selected text for use in a current chat session, a uniform resource locator (URL) is created by the work product management module 140 with a correlation to the given document. For instance, a URL is created by the work product management module 140 that relates the indemnity clause text to contract ABC. URL creation techniques are well known by one skilled in the art. The URL creation may or may not be visible to the first work product participant. The first work product participant then pastes the user-selected text into the current chat session. The act of pasting the user-selected text also incorporates the related URL. This incorporated URL may allow the first work product participant to see the user-selected text as hyperlinked text. The first work product participant then sends the user-selected text and related URL through the current chat session associated with the messaging program 147, via wireline or wireless transmission channel 150.

In step 314, the user-selected text and related URL associated with a work product document is received, from a first work product participant, by the messaging program 147. The receiving step is in response to a communication of the chat session. For example, the first work product participant sending the user-selected text and related URL through the current chat session is an instance of a communication of the chat session. Once the messaging program 147 receives the user-selected text and related URL, the process advances to step 316.

In step 316, the user-selected text along with the related uniform resource locator (URL) is provided to a second work product participant. Each of the user-selected text and the related uniform resource locator is associated with the work product document. Continuing from the previous example, the messaging program 147 receives the user-selected text and the related URL and provides that information, via wireline or wireless transmission channel 150, to the recipient of the current chat session (e.g., a second work product participant) to ultimately view on an access device, such as access device 135. In addition, the second work product participant may view the user-selected text as hyperlinked indicating that a related URL may be associated with this text.

In a preferred embodiment, the related URL corresponds to a location of the user-selected text within the work product document. For example, during the creation of the related URL, the work product management module 140 may have included, within the URL, a location reference of the user-selected text in relation to the whole work product document. For instance, one may assume for purposes of this example that the indemnity clause text referred to earlier is positioned as the seventh (7$^{th}$) clause out of ten (10). An exemplary location of the indemnity clause text in relation to the whole contract ABC document may be a seventh location reference. This reference should contain enough information to retrieve the work product document associated with the related URL. Therefore, when the second work product participant clicks on the hyperlinked user-selected text which, in turn, enables access to the related URL, the messaging program 147 receives an enablement instruction in step 318. The enablement instruction is associated with the related URL corresponding to a location of the user-selected text within the work product document. The messaging program 147 passes the instruction, via computer bus 102, to the work product management module 140. The work product management module 140 receives the instruction. In response, at step 320, the work product document associated with the related uniform resource locator is retrieved from repository module 140b. After retrieval, in step 322, a representation of the work product document is provided to the second work product participant. For example, if the second work product participant clicks on the hyperlinked text, the related URL is enabled and the location of the user-selected text is used to retrieve a representation of the work product document from repository module 140b. This representation, depending on the level of specificity for the location, may be the whole work product document or relevant parts of the work product document such as those related to the location of the user-selected text. For instance, if the second work product participant clicks on the hyperlinked indemnity clause from contract ABC, another browser, similar to browser 1381, may appear with a representation of the indemnity clause within contract ABC as well as the clauses before and after (an exemplary subset of an entire work product document). In other embodiments, the whole contract may be the representation of the work product object. Either way, a representation is only provided to the second work product participant if his/her permissions allow access to the given work product document. In other words, any permissions the second work product participant has relating to the work product document and/or work product object are applied in providing the representation, if any, to the second work product participant. For example, if the second work product participant only has view permissions, the provided representation is read only (no edit capability) for the second work product participant. If the second work product participant has the necessary permission, a representation is provided and ultimately may be displayed, via a browser similar to browser 1383, to the second work product participant.

Exemplary Interfaces

Figure 4:
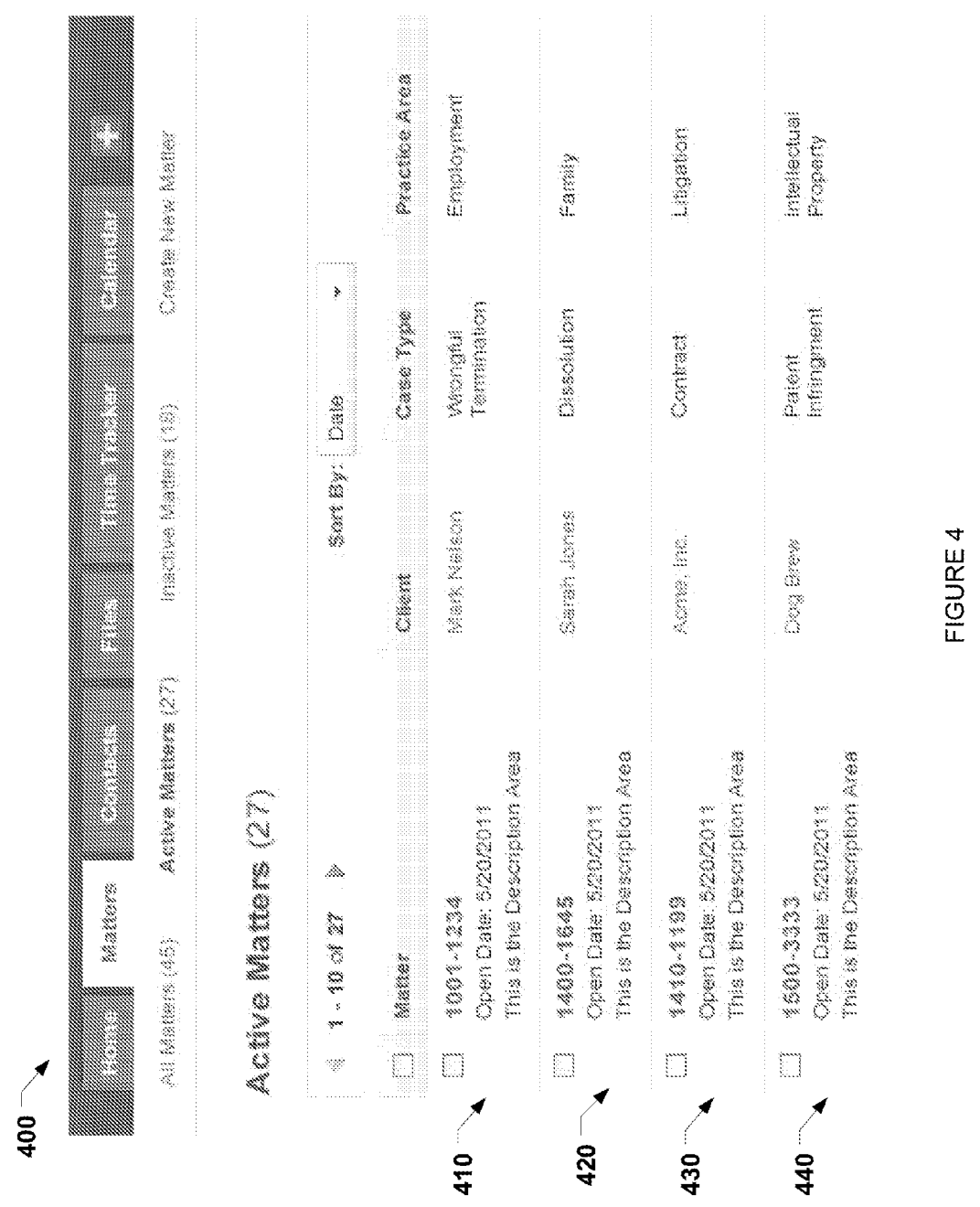

In FIG. 4, an exemplary interface 400 for work product management module 140 is shown. Within the interface 400, there are four work product objects, 410, 420, 430 and 440. Each work product object in this example represents a legal matter record. If a work product participant selected work product object 410, also known as legal matter record 1001-1234, he/she would be navigated to FIG. 5. FIG. 5 represents the details of work product object 410 (e.g., legal matter record 1001-1234) such as date opened, area of law, corporate matter ID, description and status notes. Also shown in FIG. 5 is a button that represents chat instance 515 and a set of work product participants 520 related to the messaging program 147. The set of work product participants 520 is determined by the set of permissions related to the primary work product object. For example, Peter Bishop, Olivia Dunham and Walter Bishop are part of the set of work product participants 520 due to their roles within legal matter record 1001-1234. Olivia Dunham's role is an owner, a work product participant who created the work product object. Peter Bishop's role is a contributor, a work product participant who is allowed to edit, manage and contribute material related to the work product object. Walter Bishop's role is a reviewer, a work product participant who is allowed to only view, not edit, material related to the work product object. These roles are determined by the set of permissions as acceptable to allow access to the first chat instance within the primary legal matter record 1001-1234. In another example, another work product participant may have the role of delegate and/or proxy. This role may not be deemed acceptable to allow access to the chat instance. As stated previously, the work product management module 140 and/or the identity management module 148 ultimately determine which work product participants are included in the set of work product participants 520 for a particular work product object. That determination is then communicated to the messaging program 147 and the set of work product participants is ultimately displayed in a listing. In some embodiments, the set of work product participants 520 may include the status of a work product participant within the messaging program 147. For example, if user X is not using access device 130, a corresponding status may be "Offline." If user X is not using the messaging program 147 for a given amount of time, the status may be "Away." Statuses may include but are not limited to online, away, busy, offline and invisible. The generation of user-defined statuses and/or time-generated statuses is a well known technique to one skilled in the art.

FIG. 6 shows an exemplary chat session 620 initiated by a user and associated with a user-selected subset of work product participants. In particular, chat session 620 is initiated by Astrid Graham and the subset of work product participants that Astrid chooses are Peter Bishop and Olivia Dunham for work product object 410. When Astrid initiates chat session 620, she first selects a subset of work product participants from the exemplary set of work product participants 520. The exemplary chat session 620 is then created (refer to FIG. 3A and corresponding description). The chat session 620 is associated with the messaging program 147 due to the browser 1383 receiving instructions from the messaging program 147 to display the chat session 620. From there the chat session 620 continues as each work product participant sends/receives information (e.g., textual messages) using the messaging program 147 via the wireless or wireline transmission channel 150.

The embodiments described above and in the claims are intended only to illustrate and teach one or more ways of practicing or implementing the present invention, not to restrict its breadth or scope. For example, the messaging program 147 may support, enable, and/or create audio and/or video chat sessions in addition to textual chat sessions. In another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

The invention claimed is:

1. A multiple applications and communications environment comprising:

at least one primary application and at least one secondary application each executable by at least one of a processor and a memory, said secondary application being of a different application type from the primary application, wherein the at least one primary application is associated with a primary work product object and the at least one secondary application is associated with a secondary work product object, the primary work product object comprising a primary work product matter further comprising at least one of a primary event or a primary topic and the secondary work product object comprising a secondary work product matter further comprising at least one of a secondary event or a secondary topic, the primary work product object being further associated with a set of permissions granting access to one or more work product participants; and a messaging program configured to establish a first chat instance within the primary work product object and a second chat instance within the secondary work product object, said configuring comprising initiating the second chat instance upon the first chat instance having been initiated and having indentified a commonality between the primary topic or primary event and the secondary topic or secondary event, the first chat instance and the second chat instance being determined by the set of permissions associated with the primary work product object.

2. The environment of claim 1 wherein the application type is one of a web application, a file manager application or an email application.

3. The environment of claim 1 wherein the first chat instance comprises a set of work product participants determined by the set of permissions related to the primary work product object and the second chat instance comprises the set of work product participants determined by the set of permissions related to the primary work product object.

4. The environment of claim 3 wherein each work product participant in the set of work product participants is associated with a status.

5. The environment of claim 4 where in the status is online, away, busy, offline or invisible.

6. The environment of claim 3 wherein each work product participant in the set of work product participants is associated with a role.

7. The environment of claim 6 wherein the role is owner, contributor or reviewer.

8. The environment of claim 1 further comprising providing a chat session associated with the messaging program, the chat session being initiated by a work product participant and associated with a subset of work product participants.

9. The environment of claim 8 further comprising:
receiving, in response to a communication of the chat session, a set of user-selected text and a related uniform resource locator each associated with a work product document from a first work product participant; and
providing the set of user-selected text and the related uniform resource locator each associated with the work product document to a second work product participant.

10. The environment of claim 9 wherein the related uniform resource locator corresponds to a location of the set of user-selected text within the work product document.

11. The environment of claim 9 further comprising:
receiving an enablement instruction associated with the related uniform resource locator;
retrieving the work product document associated with the related uniform resource locator; and
providing a representation of the work product document to the second work product participant.

12. The environment of claim 11 wherein the representation is an entire work product document.

13. The environment of claim 11 wherein the representation is a subset of an entire work product document.

14. A system comprising:
a first multiple applications and communications environment, wherein the first multiple applications and communications environment comprises at least one primary application and at least one secondary application each executable by at least one of a processor and a memory, said secondary application being of a different application type from the primary application, wherein the at least one primary application is associated with a primary work product object and the at least one secondary application is associated with a secondary work product object, the primary work product object comprising a primary work product matter further comprising at least one of a primary event or a primary topic and the secondary work product object comprising a secondary work product matter further comprising at least one of a secondary event or a secondary topic, the primary work product object being further associated with a set of permissions granting access to one or more work product participants;

a messaging program configured to establish a first chat instance within the primary work product object and a second chat instance within the secondary work product object, said configuring comprising initiating the second chat instance upon the first chat instance having been initiated and having indentified a commonality between the primary topic or primary event and the secondary topic or secondary event, the first chat instance and the second chat instance being determined by the set of permissions associated with the primary work product object;

a second multiple applications and communications environment, wherein the second multiple applications and communications environment comprises the primary application and a tertiary application, each executable by at least one of a processor and a memory, said tertiary application being of the different application type from the primary application, wherein the primary application is associated with the primary work product object and the tertiary application is associated with a tertiary work product object comprising a tertiary work product matter further comprising at least one of a tertiary event or a tertiary topic; and the messaging program further configured to establish a third chat instance within the tertiary work product object, said third chat instance associated with the first chat instance and second chat instance, said configuring comprising initiating the third chat instance upon the second chat instance having been initiated and having indentified a commonality between the primary topic or primary event and the tertiary topic or tertiary event, the third chat instance being determined by the set of permissions associated with the primary work product object.

15. The system of claim 14 wherein the application type is one of a web application, a file manager application or an email application.

16. The system of claim 14 wherein the first chat instance comprises a set of work product participants determined by the set of permissions related to the primary work product object, the second chat instance comprises the set of work product participants determined by the set of permissions related to the primary work product object and the third chat instance comprises the set of work product participants determined by the set of permissions related to the primary work product object.

17. The system of claim 16 wherein each work product participant in the set of work product participants is associated with a status.

18. The system of claim 17 where in the status is online, away, busy, offline or invisible.

19. The environment of claim 16 wherein each work product participant in the set of work product participants is associated with a role.

20. The environment of claim 19 wherein the role is owner, contributor or reviewer.

21. The system of claim 14 further comprising a chat session associated with the messaging program, the chat session configured to be initiated by a work product participant and associated with a subset of work product participants.

22. The system of claim 21 further comprising:
receiving, in response to a communication of the chat session, a set of user-selected text and a related uniform resource locator each associated with a work product document from a first work product participant; and
providing the set of user-selected text and the related uniform resource locator each associated with the work product document to a second work product participant.

23. The system of claim 22 wherein the related uniform resource locator corresponds to a location of the set of user-selected text within the work product document.

24. The system of claim 22 further comprising:
receiving an enablement instruction associated with the related uniform resource locator;
retrieving the work product document associated with the related uniform resource locator; and
providing a representation of the work product document to the second work product participant.

25. The system of claim 24 wherein the representation is an entire work product document.

26. The system of claim 24 wherein the representation is a subset of an entire work product document.

27. A method comprising:
executing, by at least one of a processor and a memory in at least one multiple applications and communications environment, at least one primary application and at least one secondary application, said secondary application being of a different application type from the primary application, wherein the at least one primary application is associated with a primary work product object and the at least one secondary application is associated with a secondary work product object, the primary work product object comprising a primary work product matter further comprising at least one of a primary event or a primary topic and the secondary work product object comprising a secondary work product matter further comprising at least one of a secondary event or a secondary topic, the primary work product object being further associated with a set of permissions granting access to one or more work product participants; and
configuring a messaging program to establish a first chat instance within the primary work product object and a second chat instance within the secondary work product object, said configuring comprising initiating the second chat instance upon the first chat instance having been initiated and having indentified a commonality between the primary topic or primary event and the secondary topic or secondary event, the first chat instance and the second chat instance being determined by the set of permissions associated with the primary work product object.

28. The method of claim 27 wherein the application type is one of a web application, a file manager application or an email application.

29. The method of claim 27 wherein the first chat instance comprises a set of work product participants determined by the set of permissions related to the primary work product object and the second chat instance comprises the set of work product participants determined by the set of permissions related to the primary work product object.

30. The method of claim 29 wherein each work product participant in the set of work product participants is associated with a status.

31. The method of claim 30 where in the status is online, away, busy, offline or invisible.

32. The environment of claim 29 wherein each work product participant in the set of work product participants is associated with a role.

33. The environment of claim 32 wherein the role is owner, contributor or reviewer.

34. The method of claim 27 further comprising providing a chat session associated with the messaging program, the chat session being initiated by a work product participant and associated with a subset of work product participants.

35. The method of claim 34 further comprising:
receiving, in response to a communication of the chat session, a set of user-selected text and a related uniform resource locator each associated with a work product document from a first work product participant; and
providing the set of user-selected text and the related uniform resource locator each associated with the work product document to a second work product participant.

36. The method of claim 35 wherein the related uniform resource locator corresponds to a location of the set of user-selected text within the work product document.

37. The method of claim 35 further comprising:
receiving an enablement instruction associated with the related uniform resource locator;
retrieving the work product document associated with the related uniform resource locator; and
providing a representation of the work product document to the second work product participant.

38. The method of claim 37 wherein the representation is an entire work product document.

39. The method of claim 37 wherein the representation is a subset of an entire work product document.

40. A method comprising:
executing, by at least one of a processor and a memory in a first multiple applications and communications environment, a primary application and a secondary application, said secondary application being of a different application type from the primary application, wherein the at least one primary application is associated with a primary work product object and the at least one secondary application is associated with a secondary work product object, the primary work product object comprising a primary work product matter further comprising at least one of a primary event or a primary topic and the secondary work product object comprising a secondary work product matter further comprising at least one of a secondary event or a secondary topic the primary work product object being further associated with a set of permissions granting access to one or more work product participants;

configuring a messaging program to establish a first chat instance within the primary work product object and a second chat instance within the secondary work product object, said configuring comprising initiating the second chat instance upon the first chat instance having been initiated and having indentified the commonality between a primary topic or primary event and the secondary topic or secondary event, the first chat instance and the second chat instance being determined by a set of permissions related to the primary work product object;

executing, by at least one of a processor and a memory in a second multiple applications and communications environment, the primary application and tertiary application, said tertiary application being of the different application type from the primary application, wherein the primary application is associated with the primary work product object and the tertiary application is associated with a tertiary work product object, the tertiary work product object comprising a tertiary work product matter further comprising at least one of a tertiary event or a tertiary topic; and configuring the messaging program to establish a third chat instance within the tertiary work product object, said configuring comprising initiating the third chat instance upon the second chat instance having been initiated and having indentified a commonality between the primary topic or primary event and the tertiary topic or tertiary event, the third chat instance being determined by the set of permissions related to the primary work product object.

41. The method of claim 40 wherein the application type is one of a web application, a file manager application or an email application.

42. The method of claim 40 wherein the first chat instance comprises a set of work product participants determined by the set of permissions related to the primary work product object, the second chat instance comprises the set of work product participants determined by the set of permissions related to the primary work product object and the third chat instance comprises the set of work product participants determined by the set of permissions related to the primary work product object.

43. The method of claim 42 wherein each work product participant in the set of work product participants is associated with a status.

44. The method of claim 43 where in the status is online, away, busy, offline or invisible.

45. The environment of claim 42 wherein each work product participant in the set of work product participants is associated with a role.

46. The environment of claim 45 wherein the role is owner, contributor or reviewer.

47. The method of claim 40 further comprising providing a chat session associated with the messaging program, the chat session being initiated by a work product participant and associated with a subset of work product participants.

48. The method of claim 47 further comprising:
receiving, in response to a communication of the chat session, a set of user-selected text and a related uniform resource locator each associated with a work product document from a first work product participant; and
providing the set of user-selected text and the related uniform resource locator each associated with the work product document to a second work product participant.

49. The method of claim 48 wherein the related uniform resource locator corresponds to a location of the set of user-selected text within the work product document.

50. The method of claim 48 further comprising:
receiving an enablement instruction associated with the related uniform resource locator;
retrieving the work product document associated with the related uniform resource locator; and
providing a representation of the work product document to the second work product participant.

51. The method of claim 50 wherein the representation is an entire work product document.

52. The method of claim 50 wherein the representation is a subset of an entire work product document.

* * * * *

UNITED STATES PATENT AND TRADEMARK OFFICE
CERTIFICATE OF CORRECTION

PATENT NO. : 9,686,212 B2  
APPLICATION NO. : 13/749004  
DATED : June 20, 2017  
INVENTOR(S) : Scott Post et al.

Page 1 of 1

It is certified that error appears in the above-identified patent and that said Letters Patent is hereby corrected as shown below:

In the Claims

Column 17, Line 21, in Claim 1, "indentified" to read as -- identified --.

Column 18, Line 32, in Claim 14, "indentified" to read as -- identified --.

Column 18, Line 56, in Claim 14, "indentified" to read as -- identified --.

Column 20, Line 1, in Claim 27, "indentified" to read as -- identified --.

Column 21, Line 9, in Claim 40, "indentified" to read as -- identified --.

Column 21, Line 30, in Claim 40, "indentified" to read as -- identified --.

Signed and Sealed this  
Tenth Day of April, 2018

Andrei Iancu  
*Director of the United States Patent and Trademark Office*